US 6,669,768 B2

(12) United States Patent
Blease et al.

(10) Patent No.: US 6,669,768 B2
(45) Date of Patent: Dec. 30, 2003

(54) INK JET INK SET

(75) Inventors: James W. Blease, Avon, NY (US);
Steven Evans, Rochester, NY (US);
Ellen J. Pyszczek, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 95 days.

(21) Appl. No.: 10/094,072

(22) Filed: Mar. 8, 2002

(65) Prior Publication Data

US 2003/0172843 A1 Sep. 18, 2003

(51) Int. Cl.[7] ................................................ C09D 11/02
(52) U.S. Cl. .................. 106/31.49; 106/31.78
(58) Field of Search ............................ 106/31.49, 31.78

(56) References Cited

U.S. PATENT DOCUMENTS

| | | | | | |
|---|---|---|---|---|---|
| 4,325,735 A | * | 4/1982 | Ohta et al. | ................ | 106/31.49 |
| 5,173,112 A | * | 12/1992 | Matrick et al. | .......... | 106/31.43 |
| 5,205,861 A | * | 4/1993 | Matrick | ...................... | 524/101 |
| 5,224,987 A | * | 7/1993 | Matrick | ................ | 106/31.43 |
| 5,300,143 A | | 4/1994 | Schwarz, Jr. | ............ | 106/31.43 |
| 5,302,197 A | | 4/1994 | Wickramanayke et al. | ...... | 106/31.76 |
| 5,580,373 A | * | 12/1996 | Lane et al. | .................. | 524/100 |
| 5,605,750 A | | 2/1997 | Romano et al. | ......... | 428/32.17 |
| 5,723,211 A | | 3/1998 | Romano et al. | ......... | 428/32.24 |
| 5,789,070 A | | 8/1998 | Shaw-Klein et al. | ..... | 428/32.24 |
| 5,876,491 A | | 3/1999 | Gunn et al. | .............. | 106/31.46 |
| 6,001,161 A | | 12/1999 | Evans et al. | ............. | 106/31.48 |
| 6,100,315 A | * | 8/2000 | Kitamura et al. | ........... | 523/160 |
| 6,211,265 B1 | * | 4/2001 | Ohta et al. | .................. | 523/160 |
| 6,436,178 B1 | * | 8/2002 | Hosmer | .................... | 106/31.46 |

FOREIGN PATENT DOCUMENTS

| | | |
|---|---|---|
| EP | 0 069 512 B1 | 6/1986 |
| EP | 0 813 978 B1 | 11/2001 |
| JP | 75-59680 | 5/1975 |
| WO | 01-18123 | 3/2001 |

OTHER PUBLICATIONS

Blease et al., Ink Jet Printing Process, USSN10/093,773 (Attorney Docket No. 84249), filed Mar. 8, 2002.

Journal of Heterocyclic Chemistry, vol. 25, pp. 49–57, "Studies on Pyrrolidinones. Synthesis of N–Acylpyroglutamic Esters with Bactericide and Fugicide Properties," B. Rigo et al, 1/88.

* cited by examiner

*Primary Examiner*—Helene Klemanski
(74) *Attorney, Agent, or Firm*—Doreen M. Wells

(57) ABSTRACT

An ink jet ink comprising a colorant, a water-soluble ester or amide of a pyrrolidin-2-one carboxylic acid and water.

16 Claims, No Drawings

INK JET INK SET

CROSS REFERENCE TO RELATED APPLICATIONS

Reference is made to commonly assigned, U.S. patent application Ser. No. 10/093773, entitled "Ink Jet Printing Process" by Blease et al. filed of even date herewith. This copending application is incorporated by reference herein for all that it contains.

FIELD OF THE INVENTION

This invention relates to inks for ink jet printing that provide images with high print density and improved color gamut.

BACKGROUND OF THE INVENTION

Ink jet printing is a non-impact method for producing images by the deposition of ink droplets in a pixel-by-pixel manner to an image-recording element in response to digital signals. There are various methods which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various ink jet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc. For aqueous dye-based inks, the dyes needs to be sufficiently soluble in water to prepare a solution that is capable of producing adequate density on the receiving element and stable for extended periods of storage without precipitation. High quality ink jet printing with dye-based inks requires dyes which will provide both bright hue and good light fastness.

To generate full color prints via ink jet printing, ink sets comprising at least cyan, magenta and yellow inks are normally utilized. In addition a black ink is often added to enhance the printing of text and darker colors. The range of colors that can be produced with a given set of inks defines the color gamut of that ink set. For the production of high quality photorealistic images via ink jet printing, ink sets with a large color gamut are preferred. In addition, it is important that the ink sets produce images with good fastness, especially to light.

The choice of the colorants in ink jet systems is critical for both light fastness and color gamut. The color gamut of an ink set is controlled primarily by the spectral absorption characteristics of the component dyes. The primary dyes (e.g., cyan, magenta and yellow) should only absorb light of the required wavelengths (i.e., have relatively narrow absorption bands) and not overlap excessively with the dyes in the complementary inks. In addition to the light absorption characteristics of the dyes, the maximum print density achieved from the ink is another important factor to provide a high color gamut. The higher the print density the greater the color gamut.

It is well known that ink components of the ink composition other than the dye can affect print density. The non-dye components can control the depth of dye penetration into the receiving media and or the lateral spread of the dye on the receiving media thus influencing the print density.

There are many ink components or additives that are used commercially or have been described in patents. In particular, pyrrolidin-2-one and specific derivatives of pyrrolidin-2-one have been frequently used to influence printed ink performance.

U.S. Pat. No. 5,302,197 describes an ink composition that comprises a polyol/alkylene oxide condensate in combination with specific cyclic amide derivatives. Examples of the cyclic amide derivative include pyrrolidin-2-one and 1-(2-hydroxyethyl)-2-pyrrolidinone. U.S. Pat. No. 5,876,491 describes an ink composition comprising at least one specific cyclic ester or amide in combination with at least one polyhydroxy compound with at least four hydroxyl groups. An example of the cyclic amide is pyrrolidin-2-one. U.S. Pat. No. 5,300,143 describes an ink composition which comprises certain sulfone compounds in combination with specific cyclic amines an example of which is pyrrolidin-2-one. Japanese Patent Application JP 75-59680 describes ink compositions which comprise specific derivatives of 2-pyrrolidinone which includes 1-(2-hydroxyethyl)-2-pyrrolidinone.

However the print density that can be achieved in ink compositions comprising pyrrolidin-2-one, or common derivatives thereof such as 1-methyl-pyrrolidin-2-one or 1-(2-hydroxyethyl)-pyrrolidin-2-one and the like are not as high as one would desire.

It is an object of this invention to provide an ink capable of producing high print densities via ink jet printing than the inks of the prior art.

SUMMARY OF THE INVENTION

This and other objects are achieved in accordance with the present invention by providing an ink jet printing ink comprising water, a colorant and a water-soluble ester or amide of a pyrrolidin-2-one carboxylic acid which may be described by the following Structure I:

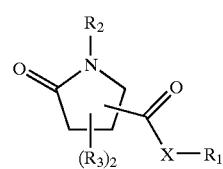

wherein $R_1$ represents a branched or unbranched alkyl group of 1 to about 8 carbon atoms;

$R_2$ represents H, an optionally substituted branched or unbranched alkyl group of 1 to about 4 carbon atoms or a poly(oxyalkylene) group of 3 to about 12 atoms, each $R_3$ independently represents H or an optionally substituted branched or unbranched alkyl group of 1 to about 8 carbon atoms, hydroxy, amino, halogen, cyano, alkoxy, alkoxycarbonyl, carboxy, ureido, carbamoyl, alkylamido or alkylsulfonamido;

X represents O or $NR_4$ where $R_4$ represents H or a branched or unbranched alkyl group of 1 to about 8 carbon atoms;

with the proviso that the water solubility of said ester or amide of a pyrrolidin-2-one carboxylic acid is greater than about 0.05%.

DETAILED DESCRIPTION OF THE INVENTION

Both dyes and pigments may be used as the colorant described in the summary of the invention.

Any cyan dye or cyan pigment or mixture thereof may be used in the cyan ink. In a preferred embodiment the cyan dye may be a water-soluble copper or nickel phthalocyanine dye such as Direct Blue 86, Direct Blue 199, or Direct Blue 307. In another preferred embodiment, the pigment is Pigment Blue 15:3 or a derivative of aluminum phthalocyanine.

Any magenta dye or magenta pigment or mixtures thereof may be used in the magenta ink. In a preferred embodiment the magenta dye is a water-soluble azo dye such as Direct Violet 107 or Reactive Red 31, a water soluble transition metal complex of an 8-heterocyclylazo-5-hydroxy quinoline such as are described in U.S. Pat. No. 6,001,161, or an anthrapyridone dye such as those described in World Patent Application 01-18123. In another preferred embodiment, the magenta pigment is Pigment Red 122.

Any yellow dye or yellow pigment or mixtures thereof may be used in the yellow ink. In a preferred embodiment the yellow dye is a water-soluble azo dye such as Direct Yellow 86, Direct Yellow 107 or Direct Yellow 132. In another preferred embodiment, the yellow pigment is Pigment Yellow 155 or Pigment Yellow 74.

Any black dye or black pigment or mixtures thereof may be used in the black ink. In a preferred embodiment, the black dye is a water-soluble metal complex azo dye such as Reactive Black 31, a water-soluble polyazo dye such as Direct Black 19Direct Black 195 or Direct Black 168, or a water-soluble sulfur dye such as Solubilized Sulfur Black 1. In another preferred embodiment, the black pigment is carbon black or derivatives of carbon black.

Any other dye or pigment or mixtures thereof may be used to prepare inks of other colors such as green, orange, violet, red, blue, white, gold, or silver.

In general, the inks of this invention comprise the above dyes or pigments at concentration of from about 0.1 to about 15%, preferably from about 0.4 to about 5% by weight of the ink jet ink composition.

The compounds of the invention described by general structure 1 (above) are commercially available or may be prepared by standard methods such as described in the Journal of Heterocyclic Chemistry, 25, 49 (1988) and European Publication No. 0 069 512 BI. The compounds of the invention may be employed at a concentration of from about 0.05% to 10%.

A humectant is usually employed in the ink jet compositions of the invention to help prevent the ink from drying out or crusting in the orifices of the printhead. Examples of humectants which can be used include polyhydric alcohols, such as ethylene glycol, diethylene glycol (DEG), triethylene glycol, propylene glycol, tetraethylene glycol, polyethylene glycol, glycerol, 2-methyl-2,4-pentanediol, 2-ethyl-2-hydroxymethyl-1,3-propanediol (EHMP), 1,5 pentanediol, 1,2-hexanediol, 1,2,6-hexanetriol and thioglycol; lower alkyl mono- or di-ethers derived from alkylene glycols, such as ethylene glycol mono-methyl or mono-ethyl ether, diethylene glycol mono-methyl or mono-ethyl ether, propylene glycol mono-methyl or mono-ethyl ether, triethylene glycol mono-methyl, mono-ethyl or mono-butyl ether (TEGMBE), diethylene glycol di-methyl or di-ethyl ether, poly(ethylene glycol) monobutyl ether (PEGMBE), and diethylene glycol monobutylether(DEGMBE), nitrogen-containing compounds, such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone.

Preferred humectants for the inks of the invention include DEG, glycerol, DEGMBE, TEGMBE, 1,2-hexanediol, 1,5-pentanediol, urea, 2-pyrrolidinone, EHMP and mixtures thereof. The humectant may be employed in each ink in an amount of from about 5 to about 60 weight percent.

Water-miscible organic solvents may also be added to the aqueous inks of the invention to help the ink penetrate the receiving substrate, especially when the substrate is a highly sized paper. Examples of such solvents include alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; ketones or ketoalcohols such as acetone, methyl ethyl ketone and diacetone alcohol, ethers, such as tetrahydrofuran and dioxane; and esters, such as, ethyl lactate, ethylene carbonate and propylene carbonate.

The amount of aqueous carrier employed is in the range of approximately 40 to 98 weight %, preferably approximately 70 to 98 weight %, based on the total weight of the ink. A mixture of water and a polyhydric alcohol, such as diethylene glycol, is useful as an aqueous carrier. In a preferred embodiment, the inks contain from about 5 to about 60 weight % of water miscible organic solvent. Percentages are based on the total weight of the ink.

Surfactants may be added to the ink to adjust the surface tension to an appropriate level. The surfactants may be anionic, cationic, amphoteric or nonionic and used at levels of 0.01 to 1% of the ink composition. Preferred surfactants include Surfynol® 465 (available from Air Products Corp.) and Tergitol® 15-S-5 (available from Union Carbide).

A biocide may be added to the ink composition employed in the invention to suppress the growth of microorganisms such as molds, fungi, etc. in aqueous inks. A preferred biocide for the ink composition employed in the present invention is Proxel® GXL (Avecia Corp.) at a final concentration of 0.0001–0.5 wt. %.

The pH of the aqueous ink compositions employed in the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethlenediamine.

A typical ink composition employed in the invention may comprise, for example, the following components by weight: colorant (0.05–20%), a water-soluble ester or amide of a pyrrolidin-2-one carboxylic acid (0.05–10%), water (20–95%), a humectant (5–70%), water miscible co-solvents (2–20%), surfactant (0.1–10%), biocide (0.05–5%) and pH control agents (0.1–10%).

Additional additives which may optionally be present in the ink jet ink compositions employed in the invention include thickeners, conductivity enhancing agents, anti-kogation agents, drying agents, defoamers, anti-corrosion aids, viscosity modifying polymers, or sequestrants.

The ink jet inks provided by this invention may be employed in ink jet printing wherein liquid ink drops are applied in a controlled fashion to an ink receptive layer substrate, by ejecting ink droplets from a plurality of nozzles or orifices of the print head of an ink jet printer.

Commercially available ink jet printers use several different schemes to control the deposition of the ink droplets. Such schemes are generally of two types: continuous stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

Ink jet inks of the present invention can be used in any of the popular ink jet printing systems, including thermal or piezoelectric drop-on-demand printers and continuous ink jet printers. Of course, the specific ink formulations will vary depending upon the type of ink jet printing system.

Ink-receptive substrates useful in ink jet printing are well known to those skilled in the art. Representative examples of such substrates are disclosed in U.S. Pat. Nos. 5,605,750, 5,723,211, and 5,789,070 and EP 813 978 A1, the disclosures of which are hereby incorporated by reference.

The following example illustrates the utility of the present invention.

EXAMPLES

Compounds described by general structure I in the Summary of the Invention above were either purchased or synthesized and purified. For the particular compounds used in the examples, the substituent groups and their positions are shown below and in Table 1.

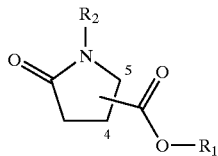

$R_1$ and $R_2$ are as defined in Table 1.

TABLE 1

| | Substituent Groups | | |
|---|---|---|---|
| Compound | $R_1$ | Position | $R_2$ |
| A | -CH$_2$CH$_3$ | 5 | H |
| B | -[CH$_2$]$_2$CH$_3$ | 5 | H |
| C | -[CH$_2$]$_3$CH$_3$ | 5 | H |
| D | -[CH$_2$]$_4$CH$_3$ | 5 | H |
| E | -CH$_2$CH$_3$ | 4 | -CH$_3$ |
| F | -[CH$_2$]$_3$CH$_3$ | 4 | -CH$_3$ |

TABLE 1-continued

| | Substituent Groups | | |
|---|---|---|---|
| Compound | $R_1$ | Position | $R_2$ |
| G | -CH(CH$_3$)CH$_2$CH$_3$ | 5 | H |
| H | -CH$_2$CH(CH$_3$)CH$_3$ | 5 | H |

Preparation of Inks

Base inks lacking a pyrrolidin-2-one derivative were prepared by simple mixing of the ingredients. After thorough mixing, each base ink was filtered through a 0.2 micron filter. Details are given in Table 2. The balance of the ink composition was water.

TABLE 2

| Base Ink Color | Dye | weight % Dye | weight % Glycerol | weight % DEG | Weight % Triethanolamine |
|---|---|---|---|---|---|
| cyan | Direct Blue 307[a] | 3.6 | 12.5 | 12.5 | 0.9 |
| magenta | Direct Violet 107[b] | 3.0 | 12.5 | 12.5 | 0.9 |
| yellow | Direct Yellow 132[c] | 4.0 | 12.5 | 12.5 | 0.9 |
| black | Reactive Black 31[d] | 7.5 | 12.5 | 12.5 | 0.0 |

[a]-available as Pro-Jet ® Fast Cyan 2 from Avecia Inc., a 6 wt. % dye solution in water
[b]-available as Pro-Jet ® Fast Magenta 2 from Avecia Inc., a 5 wt. % dye solution in water
[c]-available as Pro-Jet ® Yellow 1G from Avecia Corp., a 7.5 wt. % dye solution in water
[d]-available as Duasyn ® KRL-SF from Clariant Corp., a 15 wt. % dye solution in water

Example 1

To 97.5 parts of the cyan base ink described in Table 2, 2.5 parts of the compounds of the invention were added to produce ink mixtures as described in Table 3. Comparative ink mixtures were prepared by adding either pyrrolidin-2-one (C-1), 1-methyl-pyrrolidin-2-one (C-2), or 1-(2-hydroxyethyl)-pyrrolidin-2-one (C-3). Pyrrolidin-2-one, 1-methyl-pyrrolidin-2-one and 1-(2-hydroxyethyl)-pyrrolidin-2-one are similar in structure to the compounds of the invention but do not contain an ester group.

To evaluate the mixtures, each ink was placed in an ink cartridge for a Lexmark model Z51 printer and printed using the Lexmark Z51 printer. A printed patch at maximum dot coverage (D-max) was printed on the ink jet media types shown in Table 3. A MacBeth-Gretag Spectrolino densitometer was used to evaluate the Status A red absorbance density of each patch approximately one day after printing to allow the printed area to dry. The results are shown in Table 3.

TABLE 3

| | | Status A Red Density @D-max | | |
|---|---|---|---|---|
| Ink Mixture | Additive | Kodak Instant-Dry Glossy Media | Epson SP91001 IJ Media | Konica QP |
| 1 | Compound B | 1.87 | 2.09 | 2.01 |
| 2 | Compound C | 1.78 | 1.86 | 1.84 |
| 3 | Compound D | 1.93 | 2.00 | 1.98 |
| 4 | Compound F | 1.76 | 2.04 | 1.97 |
| 5 | Compound H | 1.95 | 1.98 | 1.99 |

TABLE 3-continued

| | | Status A Red Density @D-max | | |
|---|---|---|---|---|
| Ink Mixture | Additive | Kodak Instant-Dry Glossy Media | Epson SP91001 IJ Media | Konica QP |
| C-1 | Pyrrolidin-2-one | 1.60 | 1.83 | 1.78 |
| C-2 | 1-methyl-pyrrolidin-2-one | 1.45 | 1.54 | 1.50 |
| C-3 | 1-(2-hydroxyethyl)-pyrrolidin-2-one | 1.52 | 1.74 | 1.66 |

In each case where the ink mixture was prepared using an example compound of the invention a higher print density at maximum dot coverage was observed compared to the comparative examples (C-1, C-2 and C-3).

Example 2

Magenta ink mixtures were prepared and evaluated as described in Example 1, except that the magenta base ink from Table 2 was used in place of the cyan base ink and Status A green absorbance densities were measured. The results are shown in Table 4.

TABLE 4

| | | Status A Green Density @D-max | | |
|---|---|---|---|---|
| Ink Mixture | Additive | Kodak Instant-Dry Glossy Media | Epson SP91001 IJ Media | Konica QP |
| 6 | Compound D | 1.48 | 1.81 | 1.74 |
| C-4 | pyrrolidin-2-one | 1.39 | 1.70 | 1.66 |
| C-5 | 1-methyl-pyrrolidin-2-one | 1.41 | 1.70 | 1.70 |
| C-6 | 1-(2-hydroxyethyl)-pyrrolidin-2-one | 1.28 | 1.51 | 1.47 |

The mixture prepared using an example compound of the invention gave a higher print density at maximum dot coverage than was observed in the comparison ink mixtures (C-4, C-5 and C-6) on all media types tested.

Example 3

Yellow ink mixtures were prepared and evaluated as described in Example 1, except that the yellow base ink from Table 2 was used in place of the cyan base ink and Status A blue absorbance densities were measured. The results are shown in Table 5.

TABLE 5

| | | Status A Blue Density @D-max | | |
|---|---|---|---|---|
| Ink Mixture | Additive | Kodak Instant-Dry Glossy Media | Epson SP91001 IJ Media | Konica QP |
| 7 | Compound D | 1.57 | 1.89 | 1.90 |
| C-7 | pyrrolidin-2-one | 1.49 | 1.87 | 1.77 |

TABLE 5-continued

| | | Status A Blue Density @D-max | | |
|---|---|---|---|---|
| Ink Mixture | Additive | Kodak Instant-Dry Glossy Media | Epson SP91001 IJ Media | Konica QP |
| C-8 | 1-methyl-pyrrolidin-2-one | 1.40 | 1.71 | 1.68 |
| C-9 | 1-(2-hydroxyethyl)-pyrrolidin-2-one | 1.41 | 1.76 | 1.70 |

The mixture prepared using an example compound of the invention (7) gave a higher print density at maximum dot coverage than was observed in comparison ink mixtures (C-7, C-8 and C-9) on all media types tested.

Example 4

Black ink mixtures were prepared and evaluated as described in Example 1, except that the black base ink from Table 2 was used in place of the cyan base ink and Status A visual absorbance densities were measured. The results are shown in Table 6.

TABLE 6

| | | Status A Visual Density @D-max | | |
|---|---|---|---|---|
| Ink Mixture | Additive | Kodak Instant-Dry Glossy Media | Epson SP91001 IJ Media | Konica QP |
| 8 | Compound C | 1.52 | 1.52 | 1.84 |
| 9 | Compound D | 1.61 | 1.94 | 1.91 |
| C-10 | pyrrolidin-2-one | 1.38 | 1.69 | 1.73 |
| C-11 | 1-methyl-pyrrolidin-2-one | 1.25 | 1.50 | 1.43 |
| C-12 | 1-(2-hydroxyethyl)-pyrrolidin-2-one | 1.49 | 1.75 | 1.67 |

The mixture prepared using example compounds of the invention (C and D) gave higher print densities at maximum dot coverage than was observed in the comparison inks mixtures (C-10, C-11 and C-12) on all media types tested.

The invention has been described in detail with particular reference to useful embodiments thereof, but it will be understood that variations and modifications can be effected within the spirit and scope of the invention.

What is claimed is:

1. An ink jet ink comprising water, a colorant and a water-soluble ester or amide of a pyrrolidin-2-one carboxylic acid.

2. An ink jet ink according to claim 1 wherein the water-soluble ester or amide of a pyrrolidin-2-one carboxylic acid has the following structure:

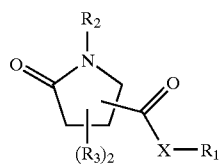

wherein $R_1$ represents a branched or unbranched alkyl group of 1 to about 8 carbon atoms;

$R_2$ represents H, an optionally substituted branched or unbranched alkyl group of 1 to about 4 carbon atoms or a poly(oxyalkylene) group of 3 to about 12 atoms, each $R_3$ independently represents H or an optionally substituted branched or unbranched alkyl group of 1 to about 8 carbon atoms, hydroxy, amino, halogen, cyano, alkoxy, alkoxycarbonyl, carboxy, ureido, carbamoyl, alkylamido or alkylsulfonamido;

X represents O or $NR_4$ where $R_4$ represents H or a branched or unbranched alkyl group of 1 to about 8 carbon atoms;

with the proviso that the water solubility of said ester or amide of a pyrrolidin-2-one carboxylic acid is greater than about 0.05%.

3. An ink jet ink according to claim 2 wherein $R_2$ and $R_3$ are H, X=O and $R_1$ is ethyl, n-propyl, iso-butyl, sec-butyl, n-butyl, n-pentyl or n-octyl.

4. An ink jet ink according to claim 2 wherein $R_2$ is methyl, $R_3$ is H, X=O and $R_1$ is ethyl, or n-butyl.

5. An ink jet ink according to claim 1 where the colorant can be a dye, a mixture of dyes, a pigment, mixture of pigments or a mixture of dyes and pigments.

6. An ink jet ink according to claim 5 where the dye is a copper or nickel phthalocyanine cyan dye.

7. An ink jet ink according to claim 6 where the dye is Direct Blue 86, Direct Blue 199, Direct Blue 307 or mixtures thereof.

8. An ink jet ink according to claim 5 where the dye is a magenta dye.

9. An ink jet ink according to claim 8 where the magenta dye is Direct Violet 107, Reactive Red 31, a transition metal complex of an 8-heterocyclylazo-5-hydroxy quinoline, an anthrapyridone dye, or mixtures thereof.

10. An ink jet ink according to claim 5 where the dye is a yellow dye.

11. An ink jet ink according to claim 10 where the yellow dye is Direct Yellow 86, Direct Yellow 107, Direct Yellow 132, or mixtures thereof.

12. An ink jet ink according to claim 5 where the dye is a black dye.

13. An ink jet ink according to claim 12 where the black dye is Direct Black 19, Direct Black 22, Direct Black 168, Direct Black 195, Reactive Black 31, or Solubilized Sulfur Black 1 or mixtures thereof.

14. An ink jet ink according to claim 5 where the colorant is a pigment or pigment mixture.

15. An ink jet ink according to claim 14 where the pigment is Pigment Blue 15:3, Pigment Red 122, Pigment Yellow 74, or Pigment Yellow 155.

16. An ink jet ink according to claim 14 where the pigment is carbon black or functionalized carbon black.

* * * * *